United States Patent
Kloberdanz et al.

(10) Patent No.: US 11,938,659 B2
(45) Date of Patent: Mar. 26, 2024

(54) INSERT TO REDUCE WELD LINE APPEARANCE DEFECT IN INJECTION MOLDING

(71) Applicant: Ford Motor Company, Dearborn, MI (US)

(72) Inventors: Jeffrey Kloberdanz, Royal Oak, MI (US); Liying Qi, Troy, MI (US)

(73) Assignee: Ford Motor Company, Dearborn, MI (US)

( * ) Notice: Subject to any disclaimer, the term of this patent is extended or adjusted under 35 U.S.C. 154(b) by 574 days.

(21) Appl. No.: 17/027,054

(22) Filed: Sep. 21, 2020

(65) Prior Publication Data
US 2021/0069950 A1 Mar. 11, 2021

Related U.S. Application Data

(62) Division of application No. 15/469,490, filed on Mar. 25, 2017.

(51) Int. Cl.
| | |
|---|---|
| *B29C 45/00* | (2006.01) |
| *B29C 45/14* | (2006.01) |
| *B29K 105/00* | (2006.01) |
| *B29K 105/06* | (2006.01) |

(52) U.S. Cl.
CPC .... *B29C 45/0025* (2013.01); *B29C 45/14065* (2013.01); *B29K 2105/0067* (2013.01); *B29K 2105/06* (2013.01)

(58) Field of Classification Search
CPC .......... B29C 66/20; B29C 2045/14942; B29C 45/1418; B29C 45/14; B29C 44/32; B29C 44/12; B29C 41/20; B29C 39/10; B29C 33/12; B29C 45/14065; B29C 45/0025
See application file for complete search history.

(56) References Cited

U.S. PATENT DOCUMENTS

2005/0067084 A1 * 3/2005 Kagan ............... B29C 66/12423
428/57

FOREIGN PATENT DOCUMENTS

WO WO-0124986 A1 * 4/2001 ......... B29C 45/0025

* cited by examiner

*Primary Examiner* — Stella K Yi
(74) *Attorney, Agent, or Firm* — Burris Law, PLLC

(57) ABSTRACT

A method of forming a part includes locating an insert at an angle within a mold cavity, sending a quantity of molten resin through the mold cavity to form a first melt front, and sending another quantity of molten resin through the mold cavity to form a second melt front such that the first melt front meets the second melt front at a weld line and each front flows along opposite sides of the insert. The mold cavity can define opposed internal surfaces and the insert can be disposed at an angle between the internal surfaces at the weld line. Also, one end of the insert can be fixedly located to one of the opposed internal surfaces and another end of the insert can float within the mold cavity.

20 Claims, 4 Drawing Sheets

INSERT TO REDUCE WELD LINE APPEARANCE DEFECT IN INJECTION MOLDING

CROSS-REFERENCE TO RELATED APPLICATIONS

This application is a divisional of U.S. application Ser. No. 15/469,490, filed on Mar. 25, 2017. The disclosure of the above application is incorporated herein by reference.

FIELD

The present disclosure relates to a method of manufacturing a part, and more specifically to an apparatus and method of reducing the appearance of surface weld lines formed from a molding process such as injection molding.

BACKGROUND

The statements in this section merely provide background information related to the present disclosure and may not constitute prior art.

Injection molding is a common process for the manufacture of parts, for example, automotive interior parts. Injection molding generally involves heating a polymeric/plastic material (e.g., thermoplastic) in the form of pellets to create a molten material. This molten material flows through the injection molding equipment and is injected through one or more flow fronts to fill a mold. Once inside the mold, the molten material then cools and solidifies to form a desired part shape (which is the shape of a cavity, or multiple cavities within the mold).

During an injection molding process, a quality and/or surface appearance issue for the consumer and/or the manufacturer arises where the molten materials join together within a mold cavity. In particular, a break in molecular orientation of the molten materials may occur, therefore a line, a notch, and/or a color change can appear and form what is commonly referred to as a weld line, an example of which is shown in FIG. 1. The location of the weld line typically occurs in locations where the molten material does not bond perfectly or where there are holes or weak areas from different molten material flow fronts. Weld lines may cause weak areas in the molded part, where the strength of the weld line can be from 10-90% of the molten materials. With a reduction in strength, when the location of the weld line is stressed, it can cause an undesirable fracture of the part.

Typical solutions to reducing weld lines include induction heating or "E-Mold" where the surface of the injection mold is brought to a super heated state to promote better bonding at the weld line locations. However, these solutions can be expensive.

The undesirable appearance and structural issues associated with weld lines in molded parts is addressed by the present disclosure.

SUMMARY

In one form of the present disclosure, a method of forming a part is provided. The method comprises locating an insert at an angle within a mold cavity, sending a quantity of molten resin through the mold cavity to form a first melt front, and sending another quantity of molten resin through the mold cavity to form a second melt front, wherein the first melt front meets the second melt front at a weld line and each front flows along opposite sides of the insert. In some variations of the present disclosure, the mold cavity defines opposed internal surfaces, and the insert is disposed at an angle between the internal surfaces at the weld line. One end of the insert can be fixedly located to one of the opposed internal surfaces and another end of the insert can float within the mold cavity. Further, a plurality of inserts may be located at an angle within at least one mold cavity, and a plurality of quantities of molten resin are sent through the mold cavity to form a plurality of melt fronts, and the plurality of melt fronts meet adjacent melt fronts at a plurality of weld lines and each adjacent front flows along opposite sides of each insert. In at least one variation, the insert defines a material having a glass transition temperature greater than or equal to a glass transition temperature of each of the quantities of molten resin. In some variations, the insert defines a reverse-S cross-sectional geometry and in at least one variation the insert is a polymeric material.

In another form of the present disclosure, a method of injection molding a part is provided. The method comprises locating an insert at an angle within a mold cavity, injecting a quantity of molten resin through the mold cavity to form a first melt front, and injecting another quantity of molten resin through the mold cavity to form a second melt front, wherein the first melt front meets the second melt front at the insert and each front flows along opposite sides of the insert. In some variations, one end of the insert is fixedly located to one internal surface of the mold cavity, and another end of the insert floats within the mold cavity.

In at least one variation, the insert defines a reverse-S cross-sectional geometry. And in some variations the insert is a polymeric material.

In some variations the mold cavity defines opposed internal surfaces, and the insert is disposed at an angle between the internal surfaces at a weld line. In such variations, one end of the insert can be fixedly located to one of the opposed internal surfaces and another end of the insert floats within the mold cavity.

In at least one variation, both quantities of molten resin are a same polymeric material. In the alternative, in some variations each of the quantities of molten resin are a different polymeric material.

In at least one variation, the method further includes locating a plurality of inserts at an angle within the one mold cavity, and injecting a plurality of quantities of molten resin through the mold cavity to form a plurality of melt fronts such that the plurality of melt fronts meets adjacent melt fronts at a plurality of weld lines, and each adjacent front flows along opposite sides of each insert. In such a variation, each of the plurality of inserts can define a reverse-S cross-sectional geometry.

These various molded parts, inserts, and methods may be employed individually or in any combination as set forth herein while remaining within the scope of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
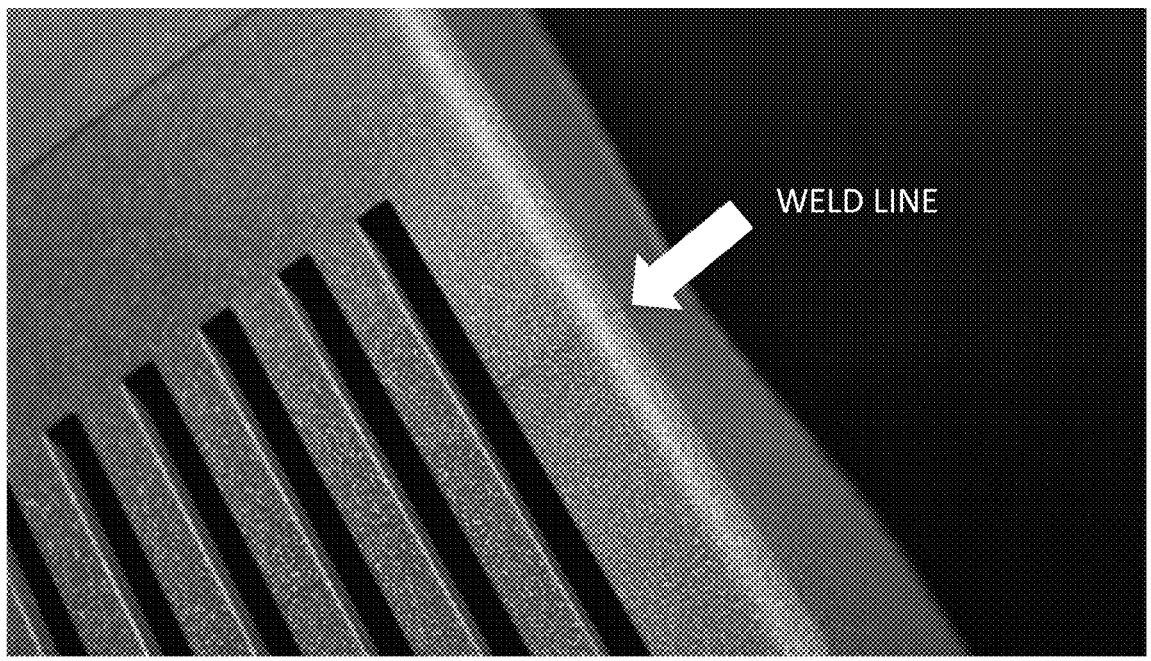
FIG. 1 is a perspective view of a molded part having a visible weld line according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2B:
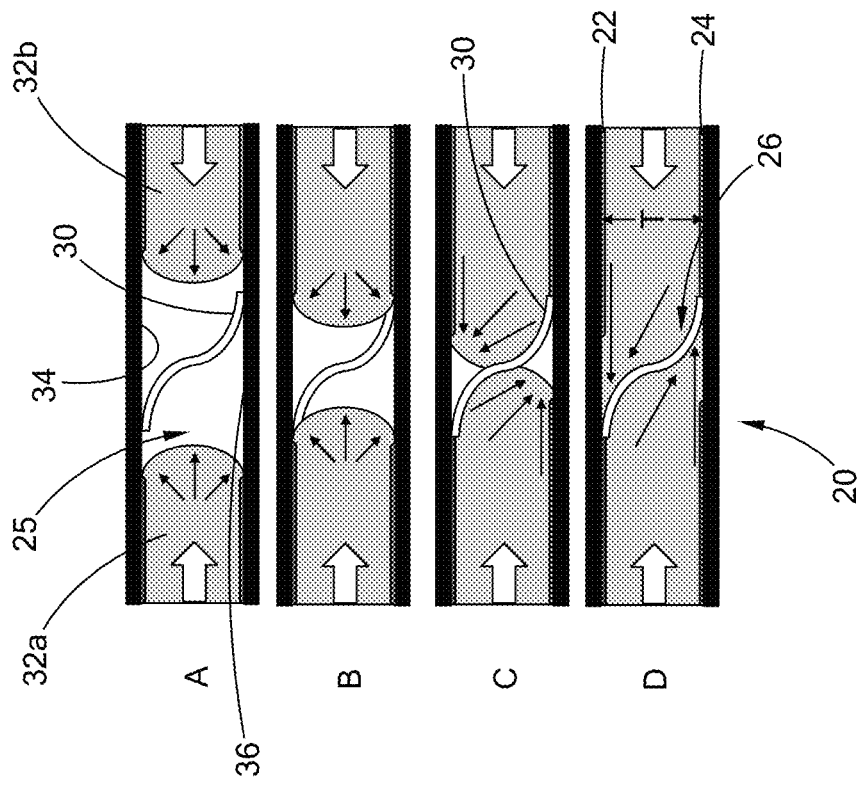
FIG. 2B is a progressive cross-sectional view illustrating weld line formation using an insert constructed according to the teachings of the present disclosure.
Figure 2A:
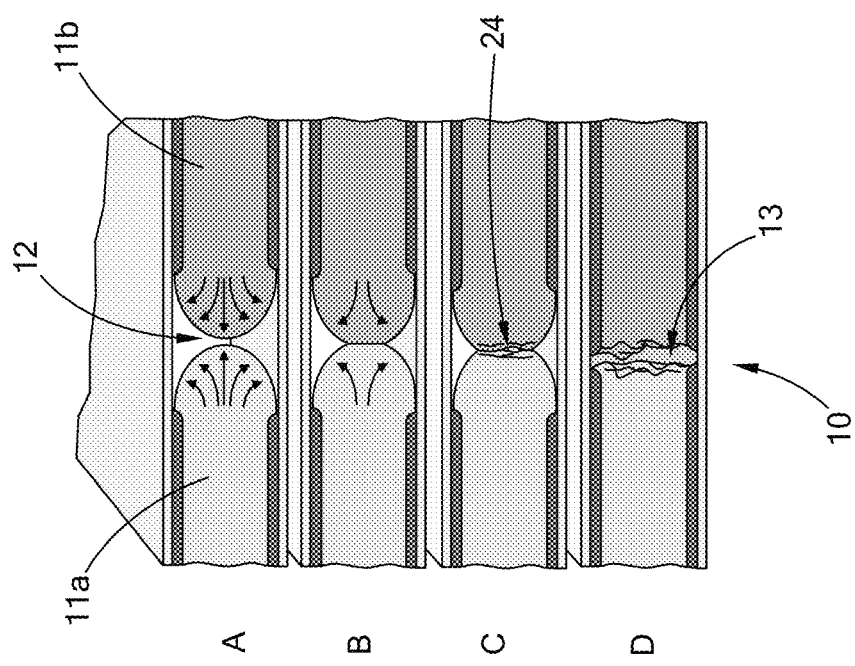
FIG. 2A is a progressive cross-sectional view illustrating a weld line being formed in a molding process according to the prior art.

Referring to FIGS. 2A and 2B, a molded part according to the prior art (10) compared with a molded part (20) according to the teachings of the present disclosure is shown. In each of these figures, steps A through D illustrate progressive movement of molten materials within a mold over time. More specifically, and referring to FIG. 2A, a molding process (e.g. injection molding) involves multiple flow fronts of molten materials 11a and 11b flowing together to fill a mold cavity 12. Molten materials 11a and 11b flow towards each other in the direction of the arrows as shown, where the arrows represent the melt fronts of each of the molten materials 11a/11b. When the mold cavity 12 is filled in step D, the molten materials 11a and 11b join together to form a line, notch and/or color change referred to as a weld line 13. Though shown as a single weld line 13, multiple weld lines may occur in the molded part 10.

Referring now to FIG. 2B, the molded part 20 according to the present disclosure includes adjacent outer surfaces 22 and 24 (step D) and comprises at least one weld line 26 extending between the adjacent outer surfaces 22 and 24. The molded part 20 includes an innovative insert 30, which is disposed at the weld line 26 and extends at an angle between the adjacent outer surfaces 22 and 24 of the molded part 20. In this form, the insert 30 defines a reverse-S cross-sectional geometry, however, it should be understood that other geometries for an insert that extend at an angle between the adjacent outer surfaces 22 and 24 may be employed while remaining within the scope of the present disclosure. Any angle may be employed provided that the insert 30 functions to reduce the visibility and/or mechanical impact of weld lines of molded parts, and thus the angle illustrated herein is merely exemplary. Further, a profile of the insert 30 (which would be in and out of the cross-section of FIG. 1B and along a surface of the molded part 20) mimics a surface contour of the final molded part 20.

As shown in molding steps A through D, as molten materials 32a and 32b flow towards each other and the insert 30, each of the materials 32a and 32b flows along opposite sides of the insert 30 as shown by the smaller arrows at the melt fronts. With this flow dynamic within the mold cavity 25 proximate the insert 30, the insert 30 functions to improve molecular and fiber orientation. As a result, the severity of the weld line 26 is reduced, or in other words, the visibility of the weld line 26 at the outer surfaces 22 and 24 is reduced, and/or the mechanical impact of the weld line 26 is reduced, with the use of the insert 30.

In one form, the insert 30 is a polymeric material, such as a thermoplastic or a thermoset. The molded part 20 may be a single polymeric material, or the molded part 20 may be at least two polymers, wherein the insert 30 is a material of one of the at least two polymers. Alternately, when the molded part 20 comprises at least two polymers, the insert 30 may be a material that is different than the polymers of the molded part 20. It should also be understood that a plurality of inserts 30 may be employed at a plurality of weld lines within the molded part 20 while remaining within the scope of the present disclosure. The molded part 20 may also be fiber reinforced. In one form, the insert 30 defines a material having a glass transition temperature greater than or equal to a glass transition temperature of each of the molten materials 32a and 32b. Generally, the insert 30 is made of a material that will remelt with the final molded part 20 to homogenize as much as possible to reduce its surface appearance and/or any impact on mechanical properties of the final molded part 20. In one form, the insert 30 may be manufactured/formed by a 3D printing process. Alternately, the insert 30 itself may be molded.

As further shown in FIG. 2B, the molded part 20 defines a thickness T at the weld line 26. In one form, the insert 30 extends through at least 90% of the thickness T. It should be understood, however, that the insert 30 may extend through various thicknesses, less than or greater than 90%, while remaining within the scope of the present disclosure.

According to a method of the present disclosure, the insert 30 is disposed at an angle between internal opposed surfaces 34 and 36 of the mold cavity 25 (step A). The insert 30 may be secured by way of a tooling locating feature (e.g., notch, not shown) or may be secured to one or both of the opposed surfaces 34/36 prior to molding using another means. In one form, the insert 30 is fixedly located to one of the opposed internal surfaces 34/36, and another end of the insert 30 floats within the mold cavity 25. Alternately, the insert 30 may entirely float within the mold cavity 25, thus resulting in a weld line 26 that moves as a function of flow dynamics of each of the molten materials 32a and 32b.

Figure 3B:
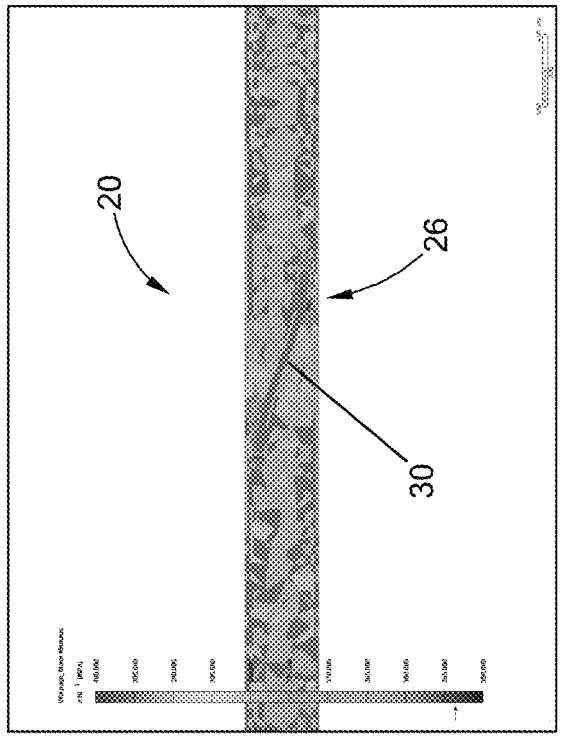
FIG. 3B is a cross-sectional plot of a simulated average major modulus across a weld line having an insert according to the teachings of the present disclosure.
Figure 3A:
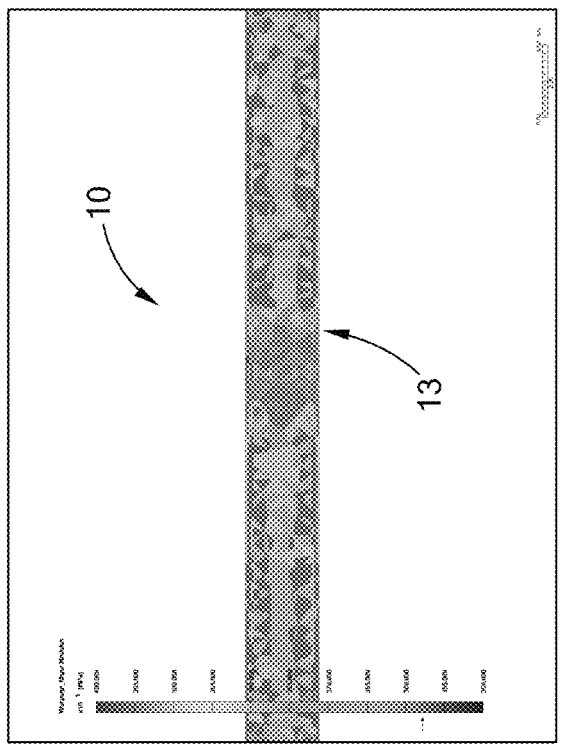
FIG. 3A is a cross-sectional plot of a simulated average major modulus across a weld line according to the prior art.

Referring now to FIGS. 3A and 3B, the average major modulus of the part 10 without an insert is compared with an average major modulus of the part 20 with an insert 30 using computer aided engineering (CAE) simulations. As shown in FIG. 3A, it is apparent that the weld line 13 has a much lower average major modulus and will result in a more visible weld line at the outer surfaces of the molded part 10. As shown in FIG. 3B, the presence of an insert 30 increases the average major modulus at the weld line 26, thus resulting in a less visible weld line at the outer surfaces and increased mechanical properties of the molded part 20.

Figure 4:
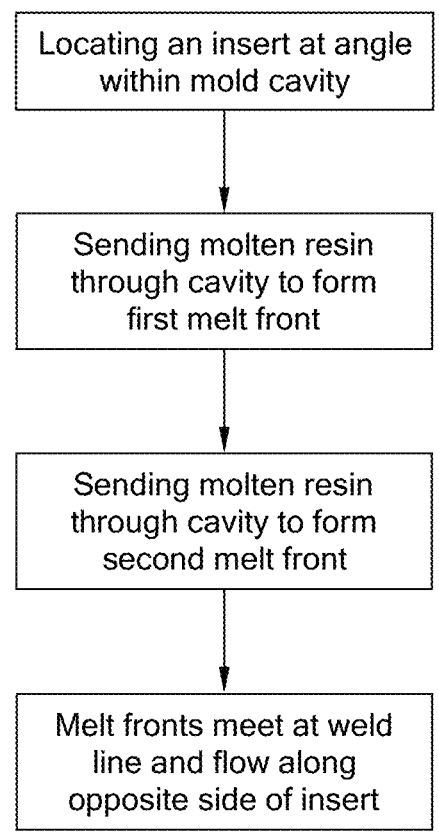
FIG. 4 is a flow diagram illustrating a method of forming a part having an insert according to the principles of the present disclosure.

Referring now to FIG. 4, a method of forming a part according to the teachings of the present disclosure is schematically illustrated. As shown, an insert is located at an angle within a mold cavity. Next, a quantity of molten resin is sent through the mold cavity to form a first melt front, and then and another quantity of molten resin is sent through the mold cavity to form a second melt front, wherein the first melt front meets the second melt front at a weld line and each front flows along opposite sides of the insert. The method may be any molding process and in one form is injection molding. In this case, the molten resin is injected through the mold cavity.

Further, a plurality of inserts may be used within the mold cavity, each being disposed at an angle within the mold cavity. With the plurality of inserts, a plurality of quantities of molten resin are sent through the mold cavity to form a plurality of melt fronts. The plurality of melt fronts meets adjacent melt fronts at a plurality of weld lines and each adjacent front flows along opposite sides of each insert.

Throughout each of the methods contemplated herein, and as set forth above, the molten resin may be a single polymeric material, or different polymeric materials may be used to form a single molded part. It should be understood that variations in materials for the molten resin and the insert may be varied and are considered to be within the scope of the present disclosure.

The location of the insert within a mold cavity may be determined either in tool trials and/or by CAE simulations.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming a part comprising:
   locating an insert at an angle within a mold cavity;
   sending a quantity of molten resin through the mold cavity to form a first melt front; and
   sending another quantity of molten resin through the mold cavity to form a second melt front,
   wherein the first melt front meets the second melt front at a weld line and each front flows along opposite sides of the insert,
   wherein the mold cavity includes a first opposed internal flat surface and a second opposed internal flat surface,
   wherein the insert includes a first end that engages the first opposed internal flat surface and a second end that engages the second opposed internal flat surface.

2. The method according to claim 1, wherein the method comprises injection molding.

3. The method according to claim 1, wherein the insert is disposed at an angle between the first opposed internal flat surface and the second opposed internal flat surface at the weld line.

4. The method according to claim 3, wherein the first end of the insert is fixedly located to the first opposed internal flat surface.

5. The method according to claim 1, further comprising:
   locating a plurality of inserts at an angle within at least one mold cavity; and
   sending a plurality of quantities of molten resin through the mold cavity to form a plurality of melt fronts,
   wherein the plurality of melt fronts meets adjacent melt fronts at a plurality of weld lines and each adjacent melt front flows along opposite sides of each insert.

6. The method according to claim 1, wherein both quantities of molten resin are a same polymeric material.

7. The method according to claim 1, wherein each quantities of molten resin are a different polymeric material.

8. The method according to claim 1, wherein the insert defines a material having a glass transition temperature greater than or equal to a glass transition temperature of each quantities of molten resin.

9. The method according to claim 1, wherein the insert defines a reverse-S cross-sectional geometry.

10. The method according to claim 1, wherein the insert is a polymeric material.

11. A method of injection molding a part comprising:
    locating an insert at an angle within a mold cavity;
    injecting a quantity of molten resin through the mold cavity to form a first melt front; and
    injecting another quantity of molten resin through the mold cavity to form a second melt front,
    wherein the first melt front meets the second melt front at the insert and each front flows along opposite sides of the insert,
    wherein the mold cavity includes a first opposed internal flat surface and a second opposed internal flat surface,
    wherein the insert includes a first end that engages the first opposed internal flat surface and a second end that engages the second opposed internal flat surface.

12. The method according to claim 11, wherein the first end of the insert is fixedly located to the first opposed internal flat surface of the mold cavity.

13. The method according to claim 11, wherein the insert defines a reverse-S cross-sectional geometry.

14. The method according to claim 11, wherein the insert is a polymeric material.

15. The method according to claim 11 wherein the insert is disposed at an angle between the first opposed internal flat surface and the second opposed internal flat surface at a weld line.

16. The method according to claim 15, wherein the first end of the insert is fixedly located to the first opposed internal flat surface.

17. The method according to claim 11, wherein both quantities of molten resin are a same polymeric material.

18. The method according to claim 11, wherein each quantities of molten resin are a different polymeric material.

19. The method according to claim 11 further comprising:
    locating a plurality of inserts at an angle within the mold cavity; and
    injecting a plurality of quantities of molten resin through the mold cavity to form a plurality of melt fronts,
    wherein the plurality of melt fronts meets adjacent melt fronts at a plurality of weld lines, and each adjacent melt front flows along opposite sides of each insert.

20. The method according to claim 19, wherein each of the plurality of inserts define a reverse-S cross-sectional geometry.

* * * * *